(12) United States Patent
Basset

(10) Patent No.: US 7,346,164 B1
(45) Date of Patent: Mar. 18, 2008

(54) COMMUNICATION INSTALLATION FOR COLLECTIVE DATA RECEPTION

(75) Inventor: Jean-Claude Basset, Paris (FR)

(73) Assignee: Thomson Licensing, Boulogne Billancourt (FR)

( * ) Notice: Subject to any disclaimer, the term of this patent is extended or adjusted under 35 U.S.C. 154(b) by 895 days.

(21) Appl. No.: 09/980,389

(22) PCT Filed: May 29, 2000
(Under 37 CFR 1.47)

(86) PCT No.: PCT/FR00/01464

§ 371 (c)(1),
(2), (4) Date: Nov. 12, 2003

(87) PCT Pub. No.: WO00/76214

PCT Pub. Date: Dec. 14, 2000

(30) Foreign Application Priority Data

Jun. 2, 1999 (FR) .................................. 99 06958

(51) Int. Cl.
*H04N 7/167* (2006.01)
(52) U.S. Cl. .................. 380/212; 380/203; 380/211; 725/109; 725/114; 725/146
(58) Field of Classification Search ............ 380/203, 380/211, 212; 725/48, 109, 114, 146
See application file for complete search history.

(56) References Cited

U.S. PATENT DOCUMENTS

| 5,440,632 A | * | 8/1995 | Bacon et al. ............... 380/242 |
| 5,592,551 A | | 1/1997 | Lett et al. .................... 380/20 |
| 5,682,195 A | | 10/1997 | Hendricks et al. ............. 348/6 |
| 6,732,368 B1 | * | 5/2004 | Michael et al. ............... 725/34 |

FOREIGN PATENT DOCUMENTS

| WO | 94/14284 | 6/1994 |
| WO | 98/17064 | 4/1998 |

* cited by examiner

*Primary Examiner*—Emmanuel L. Moise
*Assistant Examiner*—Paul Callahan
(74) *Attorney, Agent, or Firm*—Joseph J. Laks; Paul P. Kiel (57) ABSTRACT

A communication installation for communal reception of digital television and/or of multimedia data, which receives a plurality of signals emanating from separate sources. The installation of the invention comprises a network linking a multiplicity of descrambler/decoder devices, available to the users of the community, to a local server capable of demodulating the signals received so as to despatch them over the network in the form of a stream of packets of common modulation, with software applications allowing the descrambling/decoding of the signals. Thus, off-the-shelf descrambler/decoder devices of similar designs can process the various signals received.

15 Claims, 4 Drawing Sheets

COMMUNICATION INSTALLATION FOR COLLECTIVE DATA RECEPTION

This application claims the benefit, under 35 U.S.C. § 365 of International Application PCT/FR00/01464, filed May 29, 2000, which was published in accordance with PCT Article 21(2) on Dec. 14, 2000 in French and which claims the benefit of French patent application No. 99/06958 filed Jun. 2, 1999.

The invention relates to a communication installation, in particular for communal reception of information such as digital television images and/or data of multimedia type (WEB pages, files, sound, data, video images, etc), via the Internet as the case may be.

An installation of this type comprises an input interface via which it receives a signal carrying information of the aforesaid type. This signal emanates from an information source, via a cable link or wire link, over the airwaves, or else via satellite link.

Furthermore, the input interface of the installation receives from this information source, software applications which allow the conversion of the aforesaid signal, into a signal directly usable by a user on equipment such as a television screen, a video recorder, or else a micro-computer. To perform this conversion, there is provided a receiver/decoder device available to an individual user, capable of converting the aforesaid signal by using these software applications.

Known communication installations comprise one receiver/decoder device per user and per type of signal to be received. Thus, an individual user must possess several receiver/decoder devices if he wishes to use several signals arising from separate information sources and associated with different software applications. Furthermore, the connecting of this plurality of receiver/decoder devices to equipment of the aforesaid type often proves to be tricky.

The present invention aims to improve the situation.

For this purpose it proposes a communication installation, of the type comprising:
- an input interface suitable for receiving at least one first signal emanating from a first information source, as well as at least first software applications, and
- at least one receiver/decoder device, available to an individual user, devised so as to use the first software applications to undertake the conversion of the first signal with a view to direct use by the user.

According to a general definition of the invention,
- the input interface is able moreover to receive at least one second signal emanating from a second information source, as well as second software applications,
- the receiver/decoder device is devised moreover to use the second software applications to undertake the conversion of the second signal with a view to direct use of the second signal by the user, and
- the installation comprises a local server, linked, on the one hand, to the input interface and, on the other hand, to the receiver/decoder device, and comprising a dialogue module for talking to the receiver/decoder device so as to transmit, selectively as a function of a request from a user, the first or the second software applications, to the receiver/decoder device of the user, so as to undertake the conversion of the first signal or of the second signal.

Advantageously, the local server comprises a harmonizer module linked to the input interface and able to put the first and second signals into a common form, while the receiver/decoder device is devised so as to undertake the conversion of a harmonized signal which exhibits said common form.

In a preferred embodiment, the harmonizer module is devised so as to remodulate the first and second signals according to one and the same type of modulation, while the receiver/decoder device comprises a demultiplexer module advantageously devised so as to operate on signals exhibiting this type of modulation.

According to another advantageous characteristic of the invention, the receiver/decoder device comprises a memory for loading the first or second software applications, as well as a management module able to access said memory and devised so as to cooperate with the demultiplexer module, so as to undertake conversion of said harmonized signal with a view to direct use.

According to another advantageous characteristic of the invention, the installation comprises a network of connections for linking a multiplicity of receiver/decoder devices to the local server, while the local server comprises an output interface linked to the dialogue module so as to transmit, selectively as a function of the requests from the users, the first or second software applications to the corresponding receiver/decoder devices.

Preferably, the receiver/decoder devices each carry a predetermined identifier while the dialogue module cooperates with a registry of identifiers which the local server comprises, so as to talk repetitively to the receiver/decoder devices according to a question/answer type protocol.

The local server is, preferably, devised so as to successively question the receiver/decoder devices in a substantially cyclic manner, and to receive in answer the requests from the users successively As a variant or in combination with this cascaded questioning, provision may be made for burst-like questioning. In this case, the local server is devised so as to simultaneously question the receiver/decoder devices and receive in answer the requests from the users simultaneously. According to another advantageous characteristic of the invention, the local server is devised so as furthermore to transmit software applications allowing a dialogue between the receiver/decoder device and one at least of said first and second sources, according to an interactive protocol.

Advantageously the receiver/decoder device is able to communicate via a return path with the local server, while the local server comprises a communication link with the first and/or the second information source, so as to transmit to the receiver/decoder device, software applications chosen according to a request from the user.

In one advantageous embodiment of the communication installation according to the invention, the receiver/decoder device is able to transmit via said return path a request to update the first and/or second software applications.

In a particular embodiment, at least one of the first and/or second signals to be received is, in practice, a scrambled signal carrying information subject to pay-per-view, while the receiver/decoder advantageously comprises a descrambler module capable of undertaking a conversion of the first and/or second signals into descrambled signals, with the proviso of obtaining access rights.

Advantageously, the receiver/decoder device comprises a module for managing access rights able to cooperate with the scrambler module so as to activate the descrambling of the first and/or of the second signal, while the local server is able to consult said module for managing access rights, with a view to controlling the rights to which the receiver/decoder device has access.

As a variant, the receiver/decoder device is devised so as to transmit a request for access rights via said return path, while the local server is devised so as to communicate said request for access rights to the first and/or second information source, and so as to send the receiver/decoder device, software applications allowing the descrambling of the first and/or the second signal, in answer to said request for access rights.

Thus, one and the same receiver/decoder device of an installation according to the invention, is capable of selectively converting the first and second signals, on request from a user. In this regard, the present invention also targets such a receiver/decoder device.

Other characteristics and advantages of the invention will appear upon examining the detailed description hereinbelow, and the appended drawings in which.

The detailed description hereinbelow and the appended drawings contain in essence elements of definite character. They shall not only serve to better elucidate the present invention but also contribute to its definition, as appropriate.

The detailed description hereinbelow is given essentially within the framework of the communication of information of the digital television images and/or multimedia data type, by way of non-limiting example. The communication of this information is, in the example described, subject to pay-per-view.

In what follows the term "community" is understood to mean a collection of users forming a geographically localized group, such as communal apartment blocks, residential dwellings, hotels, etc.

Figure 1:
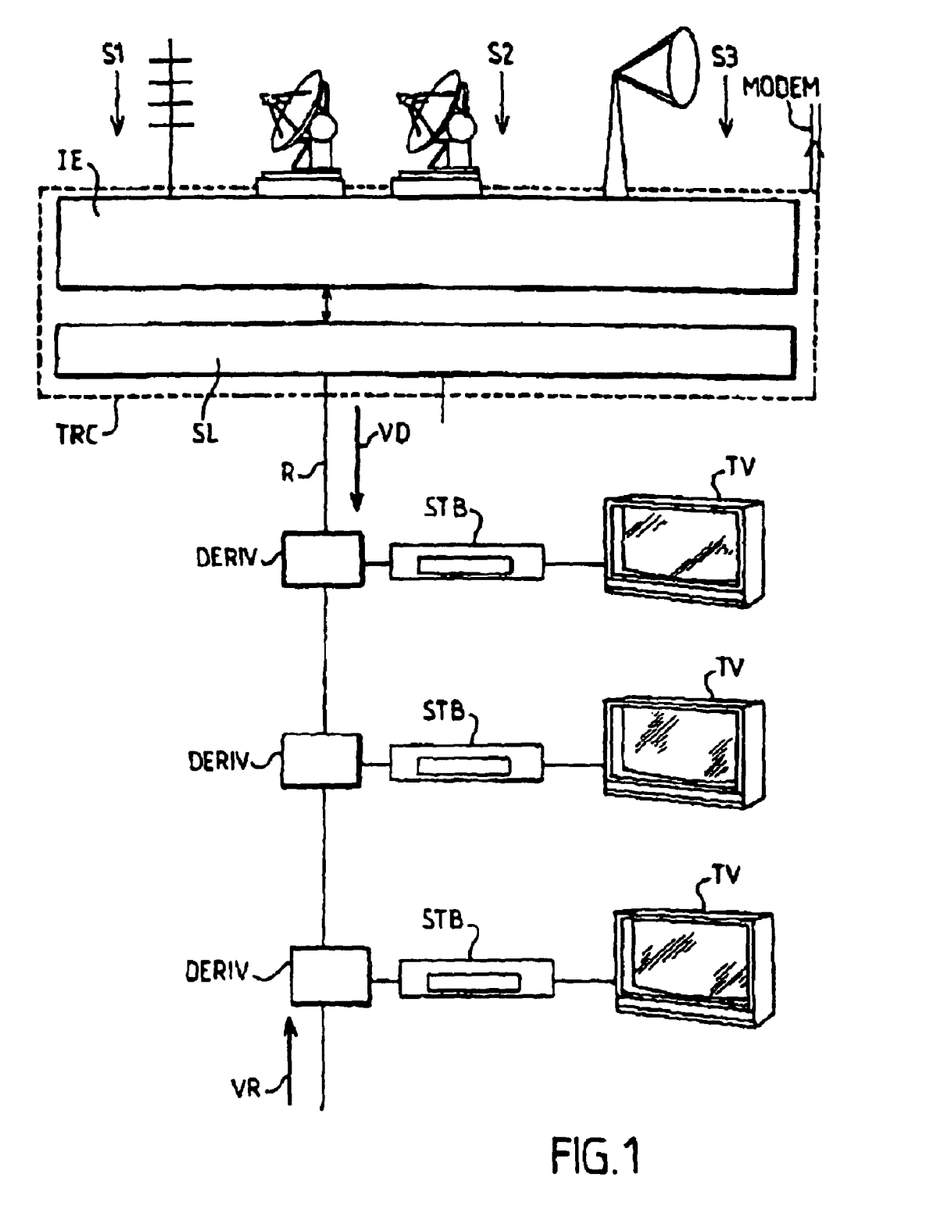
FIG. 1 diagramatically represents a communication installation according to the invention.

Referring to FIG. 1, a community is equipped with a network fitted with a TRC head capable of receiving a plurality of signals emanating from separate information sources. In the example, the communal network head TRC receives three signals S1, S2 and S3 of television images, transmitted over the airwaves in the case of the signal S1, by satellite link in the case of the signal S2 and by wire link or cable link in the case of the signal S3.

These various signals are of different types of modulation and, as the case may be, of different codings (MPEG, SECAM or other).

For example, in the case of the digital terrestrial signal transmitted over the airwaves S1, the modulation is of COFDM type (the abbreviation standing for the term "CODED ORTHOGONAL FREQUENCY DIVISION MULTIPLEX"). In the case of the signal S2 transmitted by satellite, its modulation is of QPSK type (the abbreviation standing for the term "QUADRATURE PHASE SHIFT KEYING"). In the case of the signal S3 transmitted by cable, its modulation is of QAM type (the abbreviation standing for the term "QUADRATURE AMPLITUDE MODULATION"). In the case of two-wire links, ADSL type modulation (the abbreviation standing for the term "ASYMETRIC DIGITAL SUBSCRIBER LINE") is often used.

Additionally, at least a part of these signals carries information subject to pay-per-view. Such signals are therefore scrambled and their conversion into descrambled signals, with a view to direct use by a user, requires specific software applications.

In the example described, the signal S2 arises from the "CanalSatellite" (registered trademark) information source and the software application allowing the descrambling of this signal S2 is "MEDIAGUARD" (registered trademark), while signal S3 arises from the "TPS" (registered trademark) information source and the software application allowing its descrambling is "VIACCESS" (registered trademark). Other software applications such as "NAGRAVISION", "CONAX", etc, allow the descrambling of other signals broadcast in certain European networks.

Additionally, associated with these various types of signals are other software applications allowing the shaping of the information which they contain, and particularly interactivity between the user and the sources. For example in the case of the signal S2, the software application used is "MEDIA HIGHWAY" (registered trademark), while in the case of signal S3 the software application used is "OPEN TV" (registered trademark).

Thus, each of the signals is shaped according to a specific type of modulation, and its conversion uses one or more software applications specific to this signal.

It should be noted moreover that the signal S1, received over the airwaves, can be of digital modulation (aforesaid COFDM modulation) or else of analog modulation (SECAM or other).

The head of the communal network TRC comprises an input interface IE capable of receiving the three signals S1, S2 and S3. In the customary manner, the signals transmitted by satellite or by cable (S2 and S3) must be decoded and, as the case may be, descrambled for direct use by a user. This decoding/descrambling is customarily performed by a receiver/decoder device STB (referred to more simply as a decoder in that which follows). Such a decoder STB is generally linked to equipment available to the user, such as a television TV, a video recorder, or else a microcomputer in the case of the reception of multimedia data.

Figure 2:
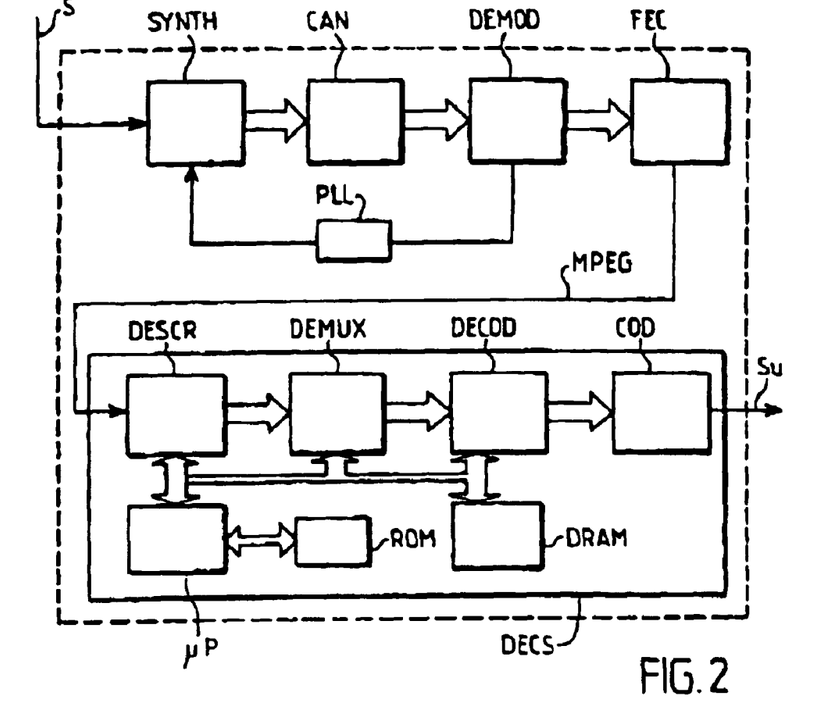
FIG. 2 represents the interactions between the elements which make up a receiver/decoder device of the prior art, delimited by dashed lines.

Referring to FIG. 2, a conventional decoder of the prior art comprises, at input, a tuner SYNTH, in cooperation with a phase-lock loop PLL for clock recovery and carrier recovery on the signal received S of QPSK modulation (signal S2) or of QAM modulation (signal S3)

In practice, the signal S at the input of the decoder is converted into digital in CAN, then demodulated in DEMOD by cooperation with the tuner SYNTH and the loop PLL. This processing is then followed by a combination of filtering and decoding, for example a VITERBI decoding for the signal S2, which thus completes a processing of the signals which is commonly referred to as "channel decoding".

The signal at the output of this channel decoding block takes the form of a stream of MPEG packets before feeding a source decoding block DECS. In the case of scrambled signals, the source decoding block commences with a descrambler module DESCR, generally driven by a microprocessor µP managing a dynamic memory DRAM, which receives from a chipcard reader (not represented) giving access rights, a key allowing descrambling. This descrambler module DESCR cooperates with a demultiplexer block DEMUX which allows the selecting by means of matched filter of the packets in the MPEG stream. In practice, the demultiplexer module of the decoder makes it possible to filter in the MPEG stream the undesired image data so as to select the image data chosen by the user. This demultiplexing block is followed by a decoder module DECOD (MPEG2 in the example described) and by a video/audio encoder COD so as to deliver signals $s_u$ for direct use to a television, a video recorder or other.

It should be noted in particular that the descrambler module DESCR, the demultiplexer block DEMUX and the MPEG format decoder (referenced DECOD), in the course of this source decoding, are driven by the microprocessor μP which cooperates with the dynamic memory DRAM and, as the case may be, with a read-only memory ROM.

The decoders/descramblers of the prior art furthermore comprise a link, generally of MODEM type (not represented), with the information source from which the signal received S emanates, so as to download, into the random access memory DRAM, software applications allowing interactivity with the source and, as the case may be, activation of the descrambling/decoding. They additionally comprise in read-only memory ROM, resident software applications which allow basic functions, for example dialogue via MODEM with the source, the functionalities of descrambling, demultiplexing and MPEG decoding, etc.

It is then apparent that each type of decoder is specific to the signal to be received, both at the level of the demodulation blocks (QPSK or QAM) which it comprises, and at the level of the software applications used.

Figure 4:
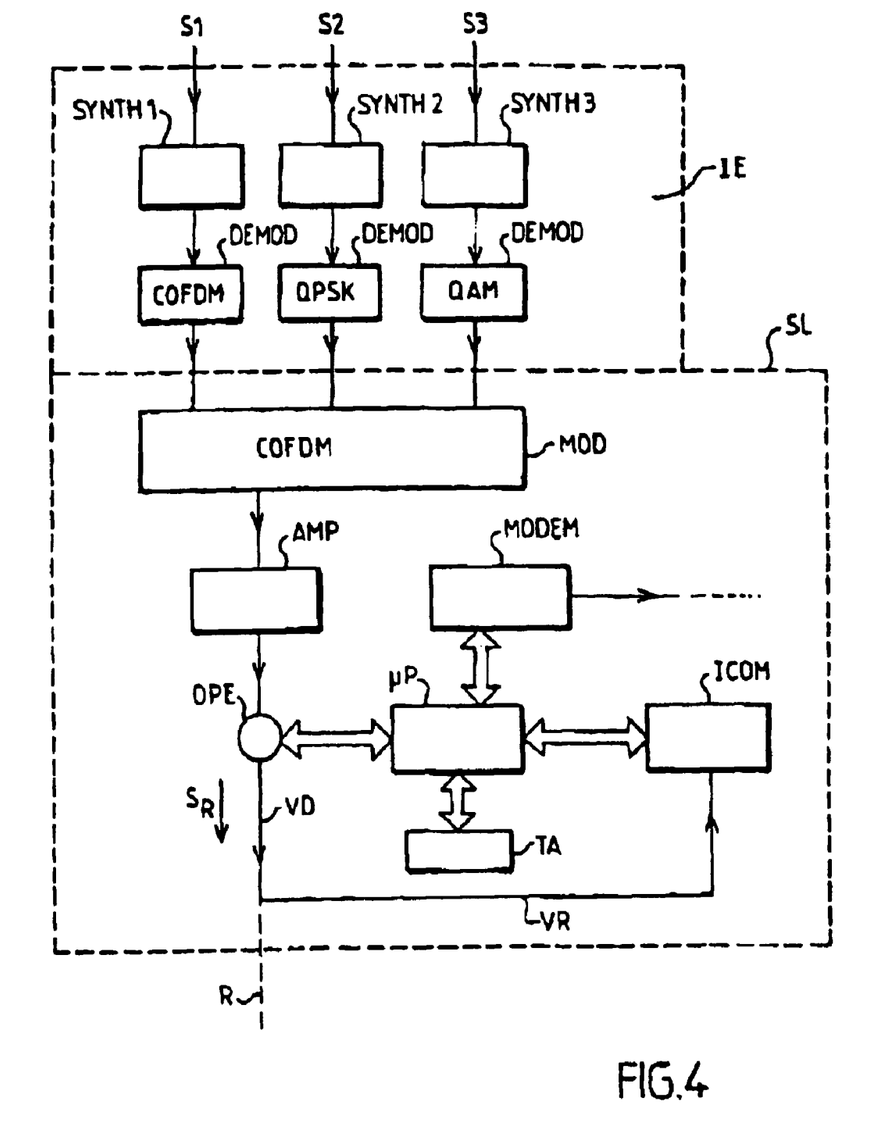
FIG. 4 diagramatically represents the interactions between the various elements of a communal network head TRC of the installation represented in FIG. 1.

Reference is thus made to FIG. 4 to describe the interactions between the elements which make up a communal network head TRC of an installation according to the invention. The input interface IE comprises three channel decoding paths, with a tuner SYNTH1, SYNTH2 and SYNTH3 for each signal S1, S2 and S3, as well as respective demodulation blocks DEMOD (for example COFDM for the signal S1, QPSK for the signal S2 and QAM for the signal S3), followed by respective filtering and decoding blocks (not represented).

The input channel for the signals S1, S2, and S3 is, preferably, frequency matched with the output channel on the network R. Advantageously, such matching is the responsibility of a software application specific to the network. In a simplified variant, this matching can be performed manually by an installer on the basis of a manually adjustable tuner.

The MPEG streams resulting from these channel decoders feed into a local server SL fitted with a modulator MOD capable of shaping the MPEG streams of the signals S1, S2 and S3 according to a common modulation. Preferably, this common modulation is of COFDM type, corresponding to the initial modulation of the signal S1 transmitted over the airwaves.

Generally, this modulation, corresponding to the modulation of the digital terrestrial signals, exhibits the following advantages:

it is not necessary to perform remodulation for the terrestrial signals, these being the most common in digital television;

this modulation offers an optimized passband for a large number of signals currently transmitted by cable;

it exhibits good resistance to breaks in network impedances; and it is compatible with the reception modules of current digital televisions.

The signals thus modulated are transposed into a chosen frequency band, typically 8 MHz.

In practice, the signals S1, S2 and S3 are preferably demodulated in DEMOD (FIG. 4), remodulated and equalized in MOD according to a common modulation (COFDM), then amplified in AMP, in the course of the processing in the communal network head TRC. They are then despatched into the network R to the decoders/descramblers STB of the users, in the form of MPEG format packets, via an output interface of the local server SL comprising a shaping module OPE. It should be noted that this MPEG packet stream is not modified by the preceding operations of demodulation and of remodulation.

Figure 3:
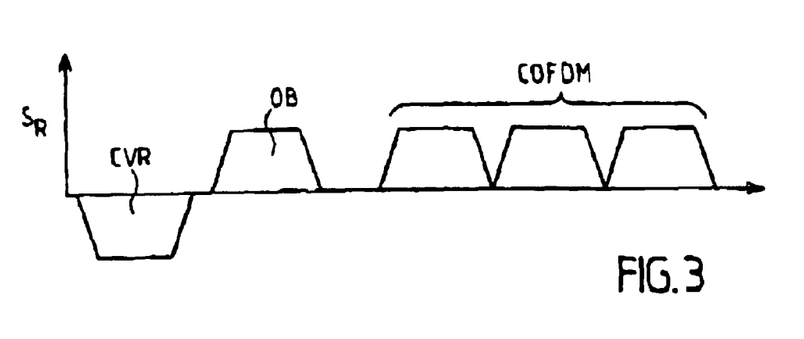
FIG. 3 diagramatically represents the shape of a signal $S_R$ broadcast by the local server in the network R.

Referring to FIG. 3, the signal $S_R$ dispatched by the local server over the network R therefore exhibits the form of an MPEG packet stream of COFDM modulation preceded by an out-of-band channel OB for the downlink path VD of the network (from the server SL to the decoders STB), as well as of a second out-of-band channel CVR allowing the management of an uplink return path VR (from the decoders STB to the server SL).

Thus, the communal network head TRC:

receives the signals S1, S2 and S3 via its input interface IE;

respectively demodulates these signals by decoding said signals S1, S2, and S3 while preserving the MPEG modulations by which the signals are transported;

remodulates these signals according to a modulation of common type (COFDM in the example described);

and dispatches them in the form an MPEG packet stream into the network R, destined for the receivers/decoders and/or descramblers of the users.

The decoders STB linked to the network R are off-the-shelf and each comprise a common demultiplexing module intended to operate on common MPEG packets of COFDM type modulation. Each decoder STB of the installation according to the invention comprises, ultimately, just one source decoding block DECS (part framed with solid lines in FIG. 2), the channel decoding being performed upstream of the network R, at the level of the communal network head TRC.

However, the software applications used by the microprocessor of a decoder STB must be transmitted through the network R according to the requests by the users (conversion into audio and video signals, descrambling, interactivity with the information sources, etc.).

The local server of the installation according to the invention comprises a dialogue module ICOM allowing interactivity between the communal network head TRC and the various decoders STB of the network R. This dialogue module interprets user requests transmitted by the decoders STB through the return path VR, so as to send in answer the software applications requested.

The channel CVR of the signal $S_R$ is reserved for the interpretation of the requests on the return path VR, while the out-of-band channel OB of the signal $S_R$ is reserved from the questioning of the decoders STB, in respect of the transmission of the software applications. Preferably, the out-of-band channels CVR and OB convey packets modulated according to a QPSK type modulation with 1 MHz of band. Thus, the dialogue between the local server and the decoders STB allows, for example, adaptation of the respective software configurations of the decoders according to the various subscriptions of the users, within the framework of televisual image broadcasting subject to pay-per-view. This adaptation of the software applications is performed in accordance with the choice of an information source (or operator) by a user. The dialogue between the local server and the decoders moreover allows the user to use the interactive services offered by the various operators.

In a preferred embodiment, the mode of dialogue is of "question/answer" type. The local server SL comprises a memory holding a table of identifiers TA of the decoders STB of the users. For each identifier, the server transmits a "token" via the out-of-band channel OB to each decoder of a user, one after the other. The decoder furnished with the token retransmits, via the channel of the return path CVR, this token which comprises, as the case may be, a new request. This type of cascaded questioning advantageously makes it possible:

to control the proper operation of the network R; and to rapidly transmit a requested software application download request.

In the example, a cycle is performed on the basis of one question every 1 millisecond. Thus, for a communal network comprising some one hundred decoders STB, the duration of the cycle is 100 milliseconds, this duration being compatible with an ITU-J112 type regular bit rate, of 1 MHz bandwidth with a bit rate of 1.544 Mb/s.

As a variant, there may be provision for a burst-like (or packet) question/answer mode. In this embodiment, the server SL downloads, following a request in the network, a set of data constituting a download of a software application. This burst-like protocol advantageously allows a direct tie up between the server and one or more decoders STB. In this mode, there may be provision to load, in practice, 1 Mbyte in 8 seconds.

Of course, these two modes, cascaded and burst-like, can coexist in one and the same version of the installation onto the invention. For example, for permanent monitoring of the requests from the users of the network, there may be provision for a cascaded question/answer mode, while for the downloading of the requested software application, there may be provided, moreover, a burst-like communication.

The dialogue module of the local server SL therefore comprises an interface for managing the return VR which, preferably, is a digital serial interface (not represented) driven, for example, by a microprocessor µP. The dialogue module ICOM cooperates with the aforesaid table of identifiers TA, by way of the microprocessor µP so as to talk to the decoders STB via messages containing an identifier of the decoder STB in the network, as well as data to be transmitted (software applications, multimedia data, etc.).

The table of identifiers TA comprises, in practice, digital addresses of the users on the communal network, at well as references of the decoders STB. This table advantageously makes it possible to estimate a topology of the network, in particular to ascertain the software implanted in the various decoders. The communal network head TRC comprises a MODEM link allowing it to communicate with the various information sources from which the signals S1, S2 and S3 emanate (or operators) and the table of identifiers thus allows the operators to control the various software applications delivered to the decoders STB of the network R.

Additionally, this MODEM link makes it possible moreover to remotely monitor the proper operation of the communal network head. Thus, if the reception and/or the channel decoding of one of the signals S1, S2 and S3 is defective, an alarm is delivered to the corresponding operator, as the case may be.

Figure 5:
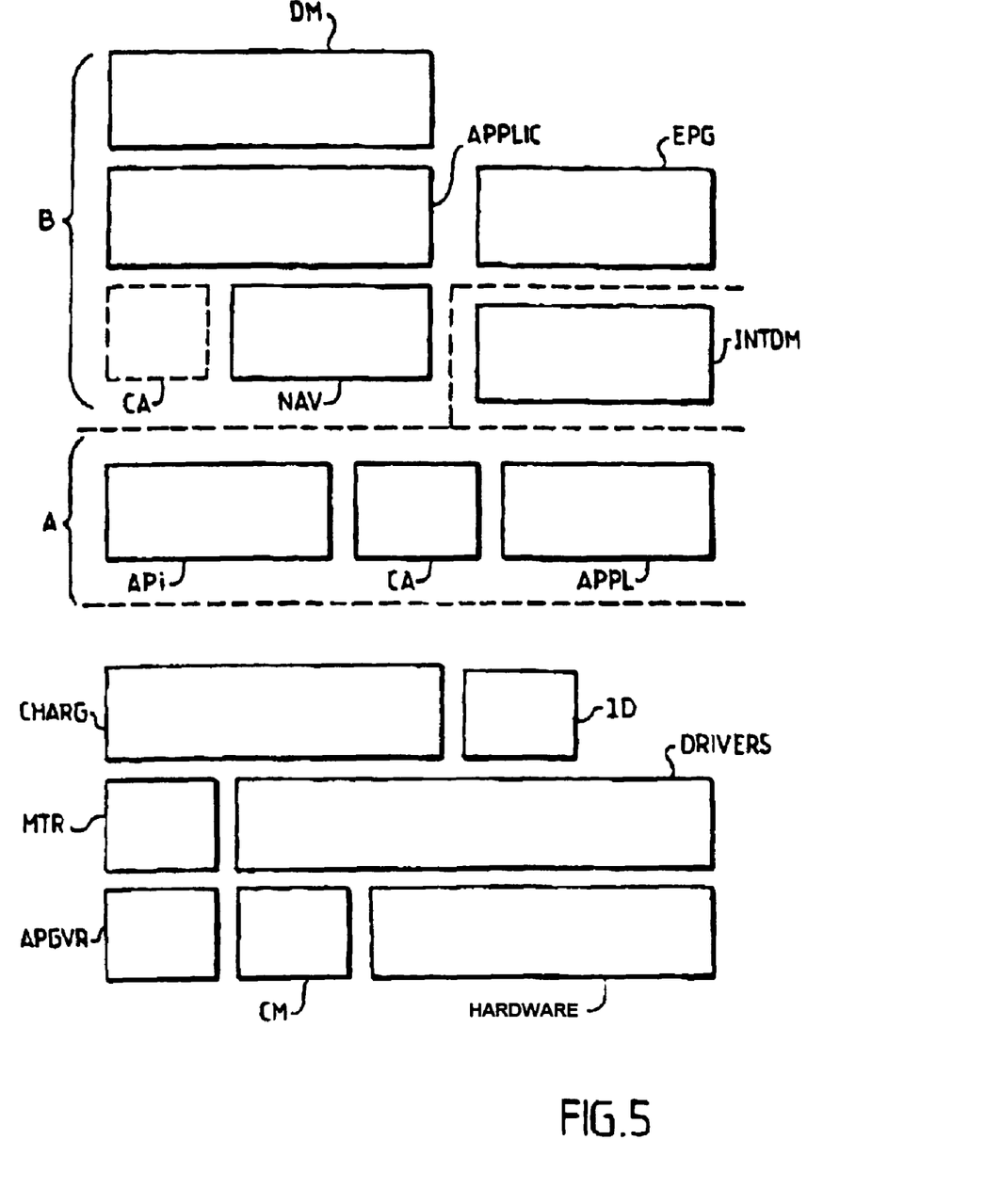
FIG. 5 represents the various software applications in memory of a receiver/decoder device of an installation according to the invention.

Reference is now made to FIG. 5 to describe the resident software applications downloaded into a receiver/decoder device STB of an installation according to the invention.

The following plurality of resident software applications are loaded into read-only memory of the decoder:

an interface CHARG for loading data broadcast in the network, in particular for initializing the decoder;

a real-time monitor MTR which caters for the real-time management of the microprocessor, as well as the system resources (memory, interrupt, queue);

a plurality of control software DRIVERS associated with a software application HARDWARE for configuring the software applications associated with the hardware used, and which cater for the management of all the hardware circuits and of the functionalities of the decoder (descrambling, decoding, video encoding, inlays within the images broadcast, etc);

a memory card interface CM, in the case where the decoders STB are equipped with a chipcard reader supplying a descrambling key for the use of images subject to pay-per-view;

this memory card interface cooperates with a decoder identification module ID (digital address of the user in the aforesaid table of identifiers); and a software application APGVR for managing the return path which caters for dialogue between the decoder and the local server.

It should be recalled here that the management of the return path allows dialogue between the local server and the decoders STB and, in particular, makes it possible to download software applications (higher layers of FIG. 5).

These downloaded software applications may be put into two categories (or layers A and B), depending on whether they emanate directly from the local server (layer A) or whether they emanate from the sources via the server (layer B).

In what follows, there is described by way of non-limiting example, decoders STB capable of descrambling signals carrying information subject to pay-per-view (digital television images and/or multimedia data).

Each decoder comprises an access control device typically comprising a chipcard reader, in combination with a micro-processor linked to the descrambling module. A change of operator then requires a change of software application in respect of the descrambling.

In a first embodiment of a decoder STB of an installation according to the invention, the means of access control and of management of the descrambling keys are loaded into the resident software applications. In this case, the decoder STB itself caters for management of access controls, without intervention by the local server. In practice, the chipcard interface CM cooperates with the identification module ID (associated with the software application relating to the identification of the user). The access control module CA, downloadable to the network and which, in this regard, appears in layer A of FIG. 5, can be transmitted to the local server.

In a different embodiment, the software applications associated with the right of access are contained in the general software applications offered by the operator via the local server. In this configuration, the receiver/decoder device STB allows the user to use navigation software applications for interactivity with the operators, these navigation software applications being accompanied by software applications relating to the right of access. On the other hand, in this embodiment, the decoder STB does not make it possible to manage the access controls in simple reception, insofar as the management of the access rights is carried out by interactivity with the operator. In this regard, the access control module CA is represented in layer B of FIG. 5, by dashed lines.

Among the downloadable software applications, the base layer A makes it possible to configure the decoder, for descrambling, demultiplexing, decoding, etc., as well as for interpreting the software applications provided by the operators, on the basis of an API type interface ensuring transmission between the resident software layers and the proprietary interfaces (OPEN TV or MEDIAHIGHWAY).

Layer A therefore comprises;
- a software application API bound to the loading interface CHARG for implanting downloaded software applications, emanating from the operators or standardized (JAVA); and
- decoding/descrambling application packages APPL making it possible to drive the source decoding performed by the decoder STB.

These basic software applications (or system software) allow:
- the direct use of non-scrambled signals (for example of the digital television images which are not subject to pay-per-view);
- downloading of the navigation software applications NAV provided by the various operators; and
- downloading the software applications INTDM, for example a JAVA interpreter, making it possible to receive multimedia data DM and to execute such applications, independent of the navigation applications NAV provided by the operators.

As was seen earlier, in the second embodiment of the aforesaid decoder, according to which embodiment the access control in respect of descrambling is performed via the local server, the access control module CA (represented by dashed lines in FIG. 5) is downloaded into layer B, in particular with the navigation software applications NAV.

In the layer B represented in FIG. 5, there are provided software applications APPLIC provided by the operators, for example "OPEN TV" for TPS and "MEDIAHIGHWAY" for CanalSatellite, making it possible to activate the descrambling of the signals S2 and S3.

Additionally, there may be provided, with the navigator software, a module EPG for guidance within the framework of interactivity between the user and the operator, as well as multimedia data DM transmitted in the course of such interactivity. In a preferred embodiment, the software applications, INTDM (multimedia data interpreter), once downloaded, reside in the read-only memory of the decoder.

Thus, according to one of the advantages afforded by the present invention, in the signal $S_R$ broadcast in the network R, the various signals S1, S2 and S3 are multiplexed and coded according to a preferred type of modulation (COFDM in the example described). Additionally, in the signal $S_R$, an out-of-band channel OB (of QPSK modulation, in the example described) carries a questioning token, while the out-of-band channel associated with the return path CVR carries a return token, associated, as the case may be, with a new request from a user (new requested software application). On the basis of the system software downloaded into layer A, the decoder is able to demultiplex the signal $S_R$ so as to select the image data desired by the user. For the decoding/descrambling image data requiring specific software applications (MEDIAHIGHWAY, OPEN TV), these software applications are transmitted selectively to the decoder STB of the user, according to his request (layer B of the aforesaid software applications).

Another advantage afforded by the present invention is that a single receiver/decoder device STB can be used to decode the various signals, associated with separate software applications, thereby simplifying the hardware available to the users (single connection of a television, of a video recorder or other, to the decoder STB).

Another advantage afforded by the present invention is the control which each operator can perform, through the local server SL, in particular of the software applications with which each decoder STB is furnished, as well the associated access rights.

Of course, the present invention is not limited to the embodiment described hereinabove by way of example. It extends to other variants.

It will thus be understood that the installation according to the invention is not limited to an application broadcasting digital images subject to pay-per-view. It may relate moreover to the broadcasting of non-scrambled images, which are accompanied by multimedia data arising from separate sources.

Additionally, the information provided by the various sources described hereinabove does not necessarily relate to television input data. This information may, as a variant, be multimedia data emanating from different sources and of different coding.

The various operators cited above (CanalSatellite, TPS, etc) are described hereinabove by way of example. Additionally, the present invention is not limited to the type of modulations described hereinabove. For example, the COFDM modulation, described hereinabove, of the signals of images broadcast on the network, although advantageous, is open to variants, in particular the coding of the return path which may use ordinary DVB protocols (QAM, QPSK) or SFDMA (Synchronous Frequency Division Multiple Access) or FCDMA (Frequency Coded Division Multiple Access) protocols.

The invention claimed is:

1. A communication installation, comprising:
an input interface suitable for receiving at least one first signal emanating from a first information source, as well as at least first software applications,
at least one receiver/decoder device, available to an individual user, devised so as to use the first software applications to undertake the conversion of the first signal with a view to direct use by the user, and
a local server, linked, on the one hand, to the input interface and, on the other hand, to the receiver/decoder device, and capable of transmitting the first software applications to the receiver/decoder device of the user so as to undertake the conversion of the first signal, wherein the input interface is able moreover to receive at least one second signal emanating from a second information source, as well as second software applications,
in that the receiver/decoder device is devised moreover to use the second software applications to undertake the conversion of the second signal with a view to direct use of said second signal,
and in that the local server comprises a dialogue module for talking to the receiver/decoder device so as to transmit, selectively as a function of a request from a user, the first or the second software applications to the receiver/decoder device of the user, so as to undertake the conversion of the first signal or of the second signal in accordance with the request from the user, wherein the local server comprises a harmonizer module linked to the input interface and able to put the first and second signals into a common form, while the receiver/decoder device is devised so as to undertake the conversion of a harmonized signal which exhibits said common form, and wherein the harmonizer module is devised so as to remodulate the first and second signals according to one and the same type of modulation, while the receiver/decoder device comprises a demultiplexer module devised so as to operate on signals exhibiting this type of modulation.

2. The installation as claimed in claim 1, wherein the receiver/decoder device comprises a memory for loading the first or second software applications, as well as a management module able to access said memory and devised so as to cooperate with the demultiplexer module, so as to undertake conversion of said harmonized signal with a view to direct use.

3. The installation as claimed in claim 1, wherein the installation comprises a network of connections for linking a multiplicity of receiver/decoder devices to the local server, while the local server comprises an output interface linked to the dialogue module so as to transmit, selectively as a function of the requests from the users, the first or second software applications to the corresponding receiver/decoder devices.

4. The installation as claimed in claim 3, wherein the receiver/decoder devices each carry a predetermined identifier and in that the local server comprises a registry of identifiers, while the dialogue module is able to cooperate with the registry of identifiers so as to talk repetitively to the receiver/decoder devices according to a question/answer type protocol.

5. The installation as claimed in claim 4, wherein a local server is devised so as to successively question the receiver/decoder devices in a substantially cyclic manner, and to receive in answer the requests from the users successively.

6. The installation as claimed in claim 4, wherein the local server is devised so as to simultaneously question the receiver/decoder devices and receive in answer the requests from the users simultaneously.

7. The installation as claimed in claim 1, wherein the local server is devised so as furthermore to transmit software applications allowing a dialogue between the receiver/decoder device and one at least of said first and second sources, according to an interactive protocol.

8. The installation as claimed in claim 1, wherein the receiver/decoder device is able to communicate via a return path with the local server, while the local server comprises a communication link with the first and/or the second information source, so as to transmit to the receiver/decoder device, software applications chosen according to a request from the user.

9. The installation as claimed in claim 8, wherein the receiver/decoder device is able to transmit via said return path a request to update the first and/or second software applications.

10. The installation as claimed in claim 1, wherein the first and/or second signals carry information regarding televisual images and/or of multimedia type.

11. The installation as claimed in claim 10, wherein the first and/or second signals are scrambled signals carrying information subject to pay-per-view, while the receiver/decoder comprises a descrambler module capable of undertaking a conversion of the first and/or second signals into descrambled signals, with the proviso of obtaining access rights.

12. The installation as claimed in claim 11, wherein the receiver/decoder device comprises a module for managing access rights able to cooperate with the scrambler module so as to activate the descrambling of the first and/or of the second signal.

13. The installation as claimed in claim 12, wherein the local server is able to consult said module for managing access rights, with a view to controlling the rights to which the receiver/decoder device has access.

14. The installation as claimed in claim 11, wherein the receiver/decoder device is devised so as to transmit to the local server a request for access rights, while the local server is devised so as to communicate said request for access rights to the first and/or second information source, and so as to send the receiver/decoder device, software applications allowing the descrambling of the first and/or the second signal, in answer to said request for access rights.

15. A receiver/decoder device of an installation according to claim 1.

* * * * *